3,421,393
CUTTING DEVICE
Walter Kugler, Neuffen, Wurttemberg, Germany
Filed Mar. 28, 1966, Ser. No. 540,458
Claims priority, application Germany, Mar. 31, 1965,
K 55,686
U.S. Cl. 77—69          5 Claims
Int. Cl. B23b 51/04

ABSTRACT OF THE DISCLOSURE

Cutting tool for cutting apertures into paper and like material comprising a rotary cutting member of tubular configuration which cuts against a cutter die having a cutting edge and an opening into which is disposed a pin to cause the waste material to be pushed automatically into the tubular passageway of the cutting member. The pin is dimensioned to permit dust waste to fall into the opening of the cutter die.

---

This invention relates generally to a cutting tool and, more particularly, to a hole cutter used in conjunction with a cutter die adapted for cutting holes into paper, cardboard or like material.

In the prior art, it is conventional to place a stack of paper upon a support of wood or plastic material and bring the cutter to bear against the workpiece for the purpose of cutting holes thereinto. A number of disadvantages are inherent to this approach. The repeated contact with the support causes the tool tip to become rapidly dull and the support severely marked. Moreover, in the case of multilayer workpieces, while one is usually able to cut holes of uniform size and quality in the first few layers, the succeeding layers quite frequently have holes with irregular border regions. Also, with the conventional tool and dies, there is the tendency to lose the waste material out of the hole cutter. The material may fall upon the workpieces or the support and impede the work operation.

It is therefore the primary object of this invention to provide a hole cutter die which avoids the shortcomings of the prior art.

It is a further object of this invention to provide a hole cutter die which is simple in construction and operation.

It is a further object of this invention to provide a hole cutter die adapted to permit the cutting of multilayer workpieces without detrimentally affecting the uniformity of the openings in the workpieces.

It is a further object of this invention to provide a hole cutter die which eliminates the need for a conventional support structure.

It is a further object of this invention to provide a hole cutter die which is provided with means to prevent spillage of the waste material from the hollow confines of the hole cutter.

It is a still further object of this invention to provide a hole cutter die adapted to receive the dust particles that may accumulate adjacent to the cutting area, and in which the dust can be suitably stored for removal.

An aspect of the present invention resides in the provision of a hole cutter die for cutting holes into a stack of paper, or like material, the die being used in conjunction with a hollow hole cutter which has at its lower end a cutting edge. The die comprises a body formed with a central opening adapted for receiving the cutting end portion of the cutter. An elongated pin is concentrically arranged within the opening, spacedly from the walls defining the opening and at the upper end disposed flush with the outer surface of the die body. The outside diameter of the pin is substantially the same as the inside diameter of the hollow hole cutter.

For a better understanding of the present invention, together with further objects thereof, reference is had to the following description taken in connection with the accompanying drawing and their scope will be pointed out in the appended claims.

Figure 1:
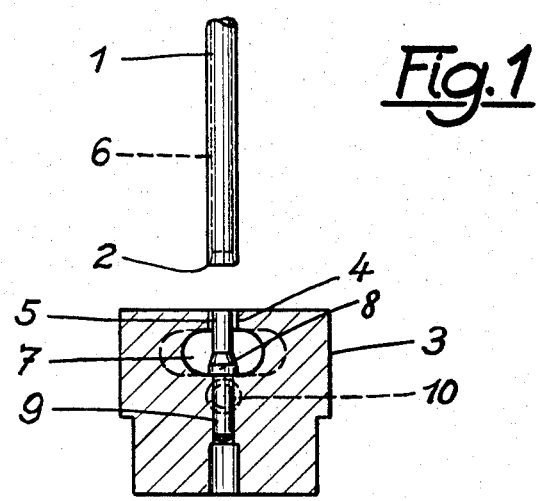
Figure 2:
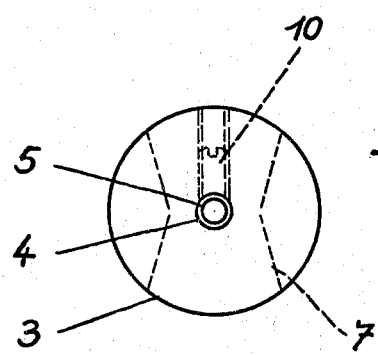

In the drawing:
FIGURE 1 is a cross-sectional view of the hole cutter die and the cutter; and
FIGURE 2 is a plan view of the invention as illustrated in FIGURE 1.

Referring now to FIGURE 1, there is shown a conventional hole cutter 1, of the hollow type, provided at the lower terminal end 2 thereof with a sharp cutting edge. The end portion 2 has a generally frusto cone-like configuration.

The hole cutter 1 is utilized in conjunction with a hole cutter die 3 formed of hardened steel and provided near the axial center thereof with a bore 4 of a diameter which suitably corresponds to the diameter of cutter 1. Concentrically disposed within the opening 4 is an elongated, cylindrical, pin 5 whose diameter is slightly less than the inside diameter, see 6, of the cutter 1 and the upper end of the pin 5 terminates flush with the upper surface of the die 3.

The die is further provided with a cross bore 7 which flares outward, from the central axis. The cross bore 7 extends transversely through the die intersecting with the bore 4 establishing a continuous passageway therewith.

The central portion of the pin 5 is provided with a radially enlarged shoulder 8 abutting the bottom surface of bore 7 and providing support for the pin member. The lower end of the pin extends into a continuation of the opening 4 which, however, is of a slightly lesser diameter to establish a sliding fit. The lower end 9 of the pin 8 is inserted into opening 4 in such a manner that the pin may be removed without any difficulty. In order to maintain the pin in position, a setscrew 10 protrudes transversely with respect to said pin and engages the same in locking position.

In operation, the hole cutter 1 is placed, in the conventional manner, into a drill spindle and forced to cut against the upper edge of the die opening 4. The pin 5, respectively the die 3, is placed in proper juxtaposition to the cutter and causes the waste material to be pushed upward through opening 6 in the cutter 1.

The dust generated during the operation accumulates in the cross bore 7. The dust will have the tendency to push itself outward or, alternatively, can be removed from time to time as required.

The invention can be utilized, with great advantage, in conjunction with semi and fully automatic paper working machines, particularly as the device requires little, if any, attention and provides uniformity of production.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:
1. Cutting tool for cutting holes into paper or like material, comprising:
a rotary hole cutter of tubular configuration having a continuous passageway and terminating at one end with a cutting edge;
a die body having an opening and a cutting edge defining said opening and adapted for engaging the cutting end of the hole cutter; an elongated, stationary pin arranged concentrically within said open- ing radially spaced from the walls defining said opening ,the outside diameter of said pin being substantially the same as the inside diameter of the tubular hole cutter; whereby upon engagement of the tubular hole cutter with the paper, the waste material is automatically pushed upward through the passageway of the cutter and the waste dust is caused to fall into said opening.

2. A die according to claim 1, wherein said pin is substantially cylindrical and provided with a radially enlarged supporting shoulder located intermediate of the axial ends and abutting the die body.

3. A tool according to claim 2, wherein said body is provided with a second opening located in coaxial relationship to the first opening but of relatively smaller diameter; said pin including an axial extension extending from said shoulder into said second opening.

4. A tool according to claim 1, wherein said body is provided with an opening extending in a plane transversely therethrough and intersecting said central opening.

5. A tool according to claim 2, wherein said pin is arranged in said central opening with a sliding fit, and a set screw extending through said body transversely relative to said pin and bearing upon it.

References Cited

UNITED STATES PATENTS

| | | | |
|---|---|---|---|
| 1,269,619 | 6/1918 | Lepper | 77—69 XR |
| 115,156 | 5/1871 | Brown et al. | 83—123 |

FRANCIS S. HUSAR, *Primary Examiner.*

U.S. Cl. X.R.

145—119; 83—123